US009481500B2

(12) United States Patent
Tasner et al.

(10) Patent No.: US 9,481,500 B2
(45) Date of Patent: Nov. 1, 2016

(54) PACKAGE FOR HOLDING ARTICLES

(71) Applicant: PulpWorks, Inc., San Rafael, CA (US)

(72) Inventors: Paul Stephen Tasner, Greenbrae, CA (US); Elena Olivari, San Francisco, CA (US)

(73) Assignee: PulpWorks, Inc., San Rafael, CA (US)

( * ) Notice: Subject to any disclaimer, the term of this patent is extended or adjusted under 35 U.S.C. 154(b) by 703 days.

(21) Appl. No.: 13/872,687

(22) Filed: Apr. 29, 2013

(65) Prior Publication Data

US 2013/0283739 A1 Oct. 31, 2013

Related U.S. Application Data

(60) Provisional application No. 61/640,711, filed on Apr. 30, 2012.

(51) Int. Cl.
*B65D 75/36* (2006.01)
*B65D 65/38* (2006.01)
*B65B 5/04* (2006.01)

(52) U.S. Cl.
CPC .............. *B65D 65/38* (2013.01); *B65B 5/04* (2013.01); *B65D 75/366* (2013.01); *B65D 2575/365* (2013.01); *B65D 2575/368* (2013.01); *Y02W 90/14* (2015.05)

(58) Field of Classification Search
CPC ........... B65B 5/04; B65B 61/20; B65D 5/38; B65D 65/38; B65D 73/00; B65D 73/0021; B65D 75/22; B65D 75/36; B65D 2075/361; B65D 2075/363; B65D 2075/365; B65D 2575/365; B65D 2575/368
USPC .............. 206/461, 464, 465, 467, 468, 471; 53/410, 416; D9/415, 418
See application file for complete search history.

(56) References Cited

U.S. PATENT DOCUMENTS

| | | | | | |
|---|---|---|---|---|---|
| 2,941,664 | A | * | 6/1960 | Palmer | B65D 73/0014 206/461 |
| 3,550,769 | A | * | 12/1970 | Marks | B65D 11/10 206/461 |
| 3,896,933 | A | * | 7/1975 | Bockemuhl | B65D 25/22 206/461 |
| 4,981,212 | A | * | 1/1991 | Lutz | B65D 73/0057 206/465 |
| 6,695,143 | B2 | * | 2/2004 | Alm | B65D 11/10 206/464 |
| 7,128,222 | B2 | * | 10/2006 | Doucette | B65D 75/367 211/85.4 |
| 8,550,250 | B2 | * | 10/2013 | Wade | B65D 73/0092 206/467 |

* cited by examiner

*Primary Examiner* — Bryon Gehman
(74) *Attorney, Agent, or Firm* — Sterne, Kessler, Goldstein & Fox P.L.L.C.

(57) ABSTRACT

The invention provides for a recyclable and compostable package that includes a molded pulp backing piece and a front or face card connected/interlocked to that. The backing piece is molded with a cavity to hold an article. The face card covers and protects the article, the cavity, and may cover most, if not all, of the backing piece. Each piece can comprise recycled paper, paperboard, molded pulp or some combination thereof.

20 Claims, 4 Drawing Sheets

PERSPECTIVE OF COMPLETE PACKAGE

COMPLETE PACKAGE

SECTION "AA"
COMPLETE PACKAGE

PERSPECTIVE OF COMPLETE PACKAGE

DETAIL OF FACE CARD TABS LOCKED INTO BACKING PIECE SLOT

EXPLODED VIEW OF FACE
CARD & BACKING PIECE

PACKAGE FOR HOLDING ARTICLES

CROSS REFERENCE TO RELATED APPLICATIONS

This application claims the benefit of U.S. Provisional Patent Application 61/640,711 filed Apr. 30, 2012, the disclosure of which is herein incorporated by reference in its entirety.

BACKGROUND OF THE INVENTION

1. Field of the Invention

Blister packaging is commonly used to display small consumer goods sold at retail. A clear PVC (polyvinyl chloride) blister, with a saleable article inside, is typically sealed to a sheet of cardboard.

2. Background Art

PVC is a commonly-used plastic found in baby shampoo bottles, packaging, saran wrap, shower curtains and thousands of other products—yet there is relatively little public awareness of its serious health and environmental impacts.

In the U.S., an estimated 300 billion pounds of longer-lasting PVC products, such as construction materials that last 30 to 40 years, will soon reach the end of their useful life and require replacement and disposal in landfills.

As much as 7 billion pounds of PVC are discarded every year in the U.S.

PVC disposal is the largest source of dioxin-forming chlorine and phthalates in solid waste, as well as a major source of lead, cadmium and organotins—which pose serious health threats to humans and the environment.

Short-lived products account for more than 70% of PVC disposed in America's solid waste with 2 billion pounds discarded every year, including "blister packs" and other packaging, plastic bottles and plastic wrap.

PVC production poses serious environmental health threats due to the manufacture of raw chemicals, including chlorine and cancer-causing vinyl chloride monomer.

U.S. communities surrounding vinyl chloride chemical facilities, half of which are in Louisiana, suffer from groundwater and air pollution.

PVC includes high amounts of toxic additives, which are released during use and disposal, resulting in elevated human exposures to chemicals.

PVC use results in dioxin emissions from PVC products burned in one million annual U.S. fires of buildings and vehicles. The International Association of Fire Fighters supports the use of alternative materials that do not pose as high a risk as PVC.

When burned, PVC plastic forms dioxins, a highly toxic group of chemicals that build up in the food chain, can cause cancer and harm the immune and reproductive systems.

PVC is the leading contributor of chlorine to four combustion sources—municipal solid waste incinerators, backyard burn barrels, medical waste incinerators and secondary copper smelters—that account for an estimated 80% of dioxin air emissions (USEPA).

More than 100 municipal waste incinerators in the U.S. burn 500 to 600 million pounds of PVC each year, forming highly toxic dioxins and releasing toxic additives to the air and in ash disposed of on land.

Open burning of solid waste, which contains PVC, is a major source of dioxin air emissions. Backyard burning of PVC household trash is unrestricted in Michigan and Pennsylvania, partially restricted in 30 states and banned in 18 states.

The incineration of medical waste is being steadily replaced by cleaner non-burn technologies.

Dumping of PVC in landfills poses long-term problems from leaching of toxic additives into groundwater, dioxin-forming landfill fires and toxic landfill gases.

Land disposal is the final fate of between 2 billion and 4 billion pounds of PVC that is discarded every year in some 1,800 municipal waste landfills.

An average of 8,400 landfill fires are reported every year in the U.S., contributing further to PVC waste combustion and dioxin pollution.

Contrary to popular belief, recycling of PVC is negligible, with estimates ranging from 0.1% to 3% of post-consumer PVC waste being recycled.

PVC is very difficult to recycle because many additives used in PVC products make it impossible to retain the unique properties of the original formulation from a batch of mixed PVC products collected for recycling.

PVC products contaminate the recycling batch when mixed with PET plastic bottles.

PVC is the most environmentally harmful plastic; many other plastic resins can substitute more safely for PVC when natural materials are not available.

Safer alternatives to PVC are widely available and effective for almost all major uses in building materials, medical products, packaging, office supplies, toys and consumer goods.

Phasing out PVC in favor of safer alternatives is economically achievable.

A PVC phase-out will likely require the same total employment as PVC production by making the same types of products from safer materials.

Policy makers at the local, state and federal level should enact and implement laws that steadily reduce the impacts of PVC disposal and lead to a complete phaseout of PVC use and waste incineration within ten years. In the interim, any PVC waste generated should be diverted away from incineration to hazardous waste landfills.

Consumers can take personal action to buy PVC-free alternatives and to remove PVC from their trash for management as household hazardous waste.

Communities can continue to organize against PVC-related dioxin sources such as waste incinerators while working to promote safer alternatives.

Therefore, the invention responds to an urgent and compelling need for improved packages that embody the intent of a blister pack but have a significantly reduced negative impact on the environment while providing consumers with enhanced functionality and design features.

BRIEF SUMMARY OF THE INVENTION

Two pieces of recyclable/compostable/biodegradable material, such as melded pulp, paperboard or cardboard, are connected to create a single package that can be used in a retail environment in a manner similar to a blister pack.

The backing piece, which can be comprised of molded pulp, holds an article in a cavity or depression designed for that specific article. The backing piece can be of any length, width or thickness. The cavity or depression can be of any size, shape or depth.

The front or face card, which can be comprised of recyclable paperboard or cardboard, covers the article and can be printed on one or both sides and/or die cut to highlight the features of the article within. The paper face card can contain the UPC bar code. The face card can be of any length, width or thickness. The locking tabs are proportional to the size of the size of the card.

The molded pulp backing piece and face card can be of recycled content: post-industrial or post-consumer waste.

The face card allows for tabs that align precisely with slots in the molded pulp backing piece. There can be two, three, four or more tabs on the face card aligned with two, three, four or more slots in the molded pulp backing piece.

The tabs on the face card can have notches such that removal is difficult once the tabs have been fully inserted in their respective slots in the molded pulp backing piece.

The face card can be glued to the molded pulp backing piece if pilferage is a concern.

The face card allows for a die cut to provide visibility to the article within.

The cavity or depression in the molded pulp backing piece can hold an article securely in place allowing for clear visibility through the die cut on the face card.

An article can be glued, or attached by other means, to the cavity or depression in the molded pulp backing piece if pilferage is a concern.

Lugs, as part of the design of the cavity or depression, can further insure the secure position of the article within.

The four corners of the package can be any shape including squared, rounded or chamfered.

There can be a hole punch at the top of the package to facilitate display in a retail environment. Typically, the package is displayed from "J" hooks, clip strips, or pegboards.

The invention, front and back pieces and the article contained within, can be assembled economically using manual or semi-automatic means of production. Higher volumes will lead to further automation reducing the time and cost of manufacturing and assembly.

The advantages of the invention, a sustainable product that is fully recyclable, biodegradable, and compliant with ISO 14000 and European Green Dot standards, versus a blister pack comprised of PVC, the most environmentally harmful plastic on our planet, are myriad.

Additional aspects and advantages of the present disclosure will become readily apparent to those skilled in this art from the following description of the drawings, wherein only illustrative embodiments of the present disclosure are shown and described. As will be realized, the present disclosure is capable of other and different embodiments, and its several details are capable of modifications in various obvious respects, all without departing from the spirit of the invention disclosure. Accordingly, the drawings and description are to be regarded as illustrative in nature, and not as restrictive.

DESCRIPTION OF THE DRAWINGS/FIGURES

Figure 1:
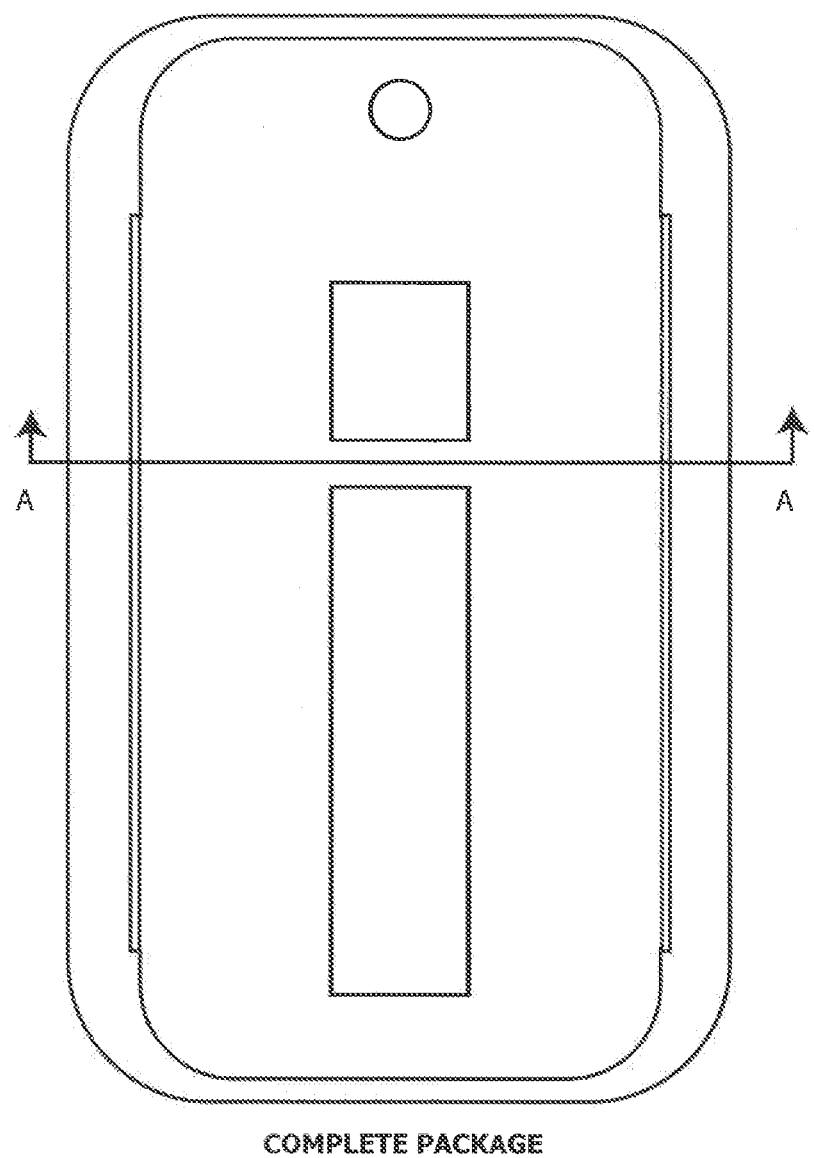
FIG. 1 shows a front-view of a complete package including a paperboard face card connected to a molded pulp backing piece.
Figure 2:
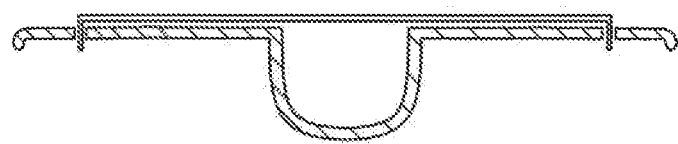
FIG. 2 shows a cross-section of the paperboard face card connected to a molded pulp backing piece taken along line A-A in FIG. 1.
Figure 3:
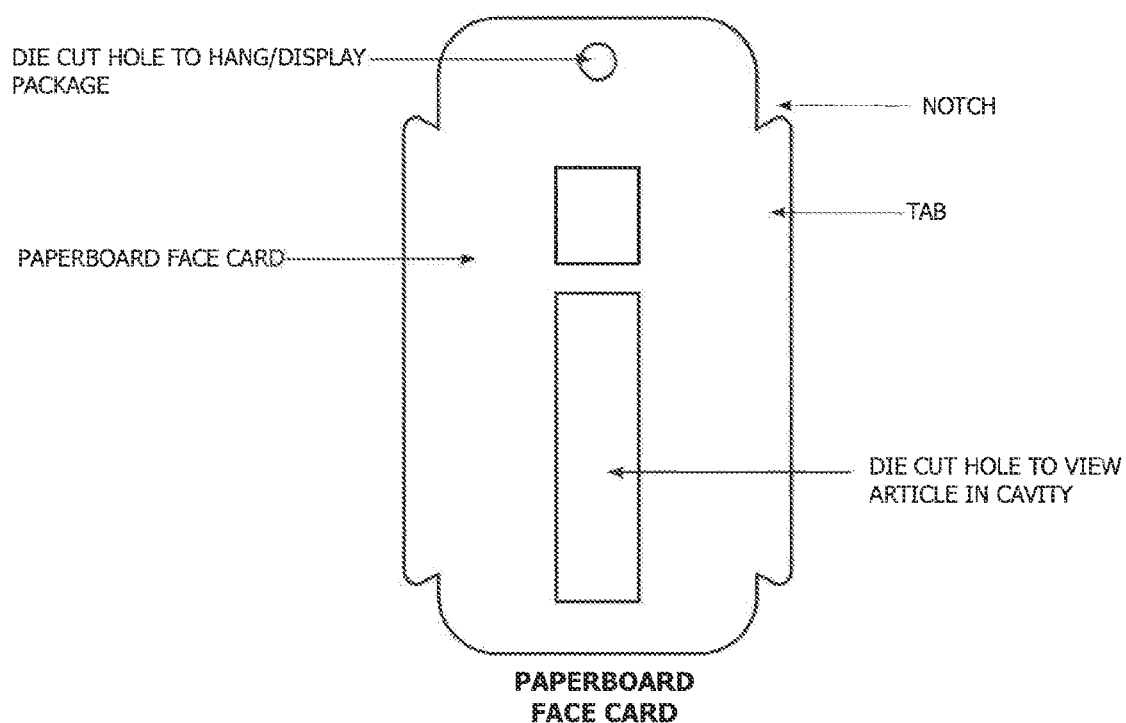
FIG. 3 shows a front-view of a paperboard face card including die cut holes, tabs and notches.
Figure 4:
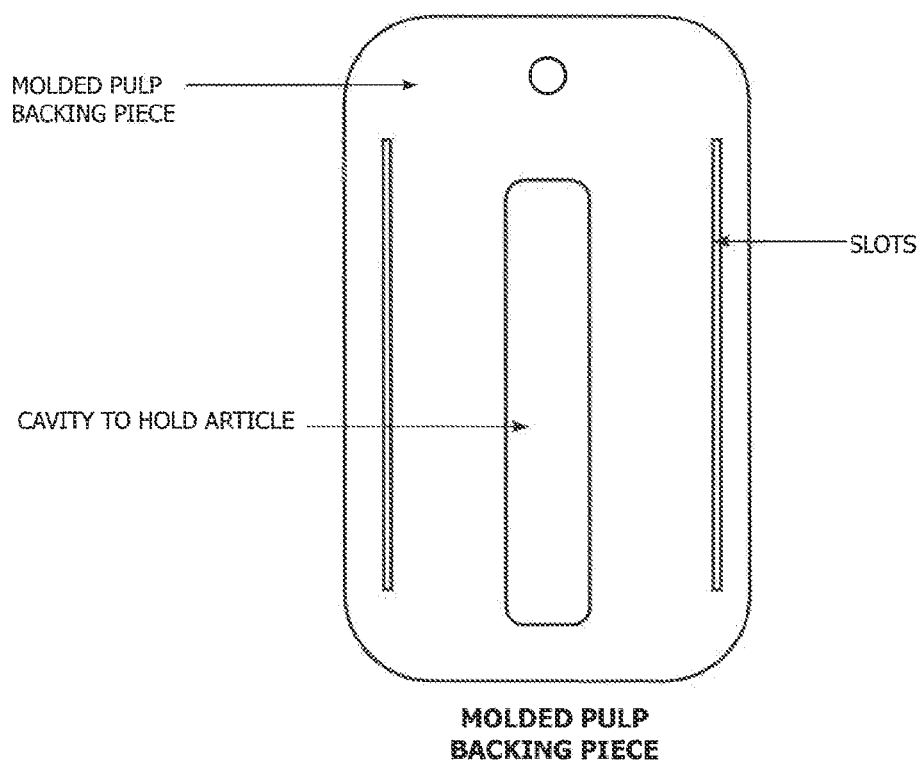
FIG. 4 shows a front-view of a molded pulp backing piece including a cavity for holding an article and slots for the tabs shown in FIG. 3.
Figure 5:
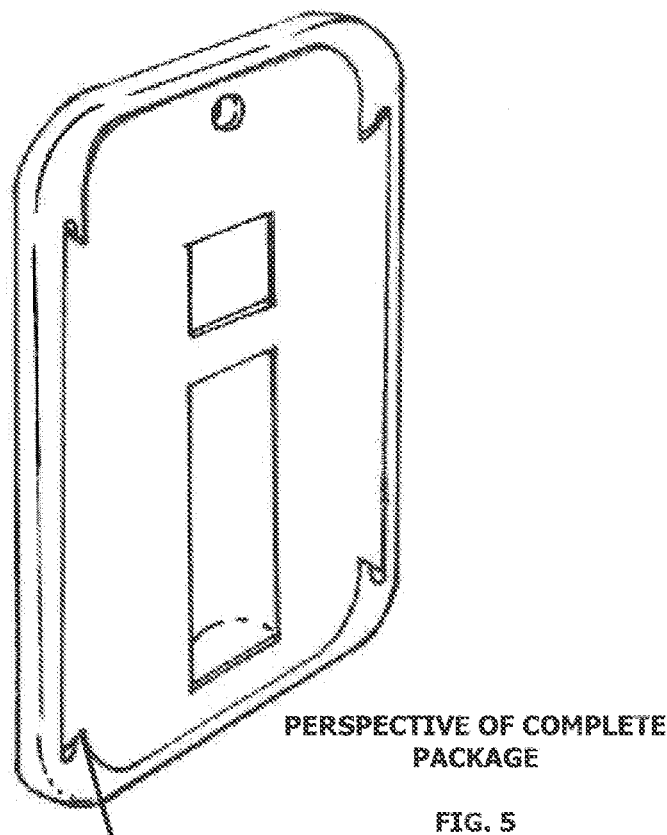
FIG. 5 shows a perspective of a complete package including a paperboard face card connected to a molded pulp backing piece.
Figure 6:
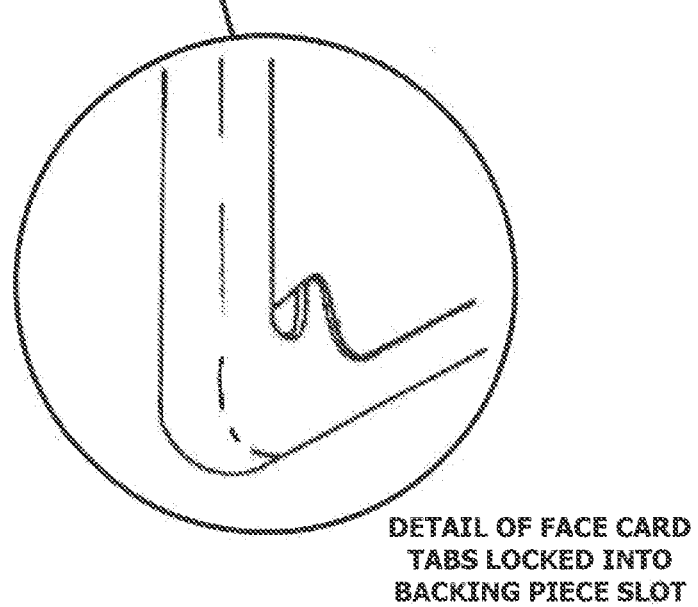
FIG. 6 shows a detailed view of a face card tab locked into a backing piece slot.
Figure 7:
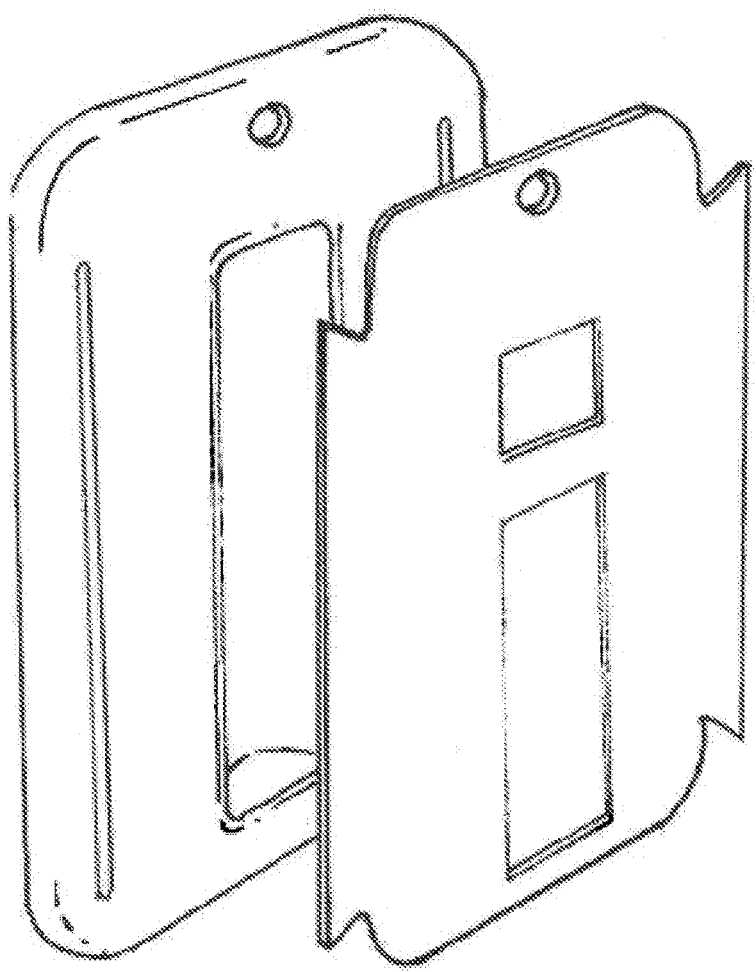
FIG. 7 shows an exploded view of a paperboard face card and a molded pulp backing piece.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Variations

From the foregoing description, it will be appreciated that the invention makes available a novel, attractive, cost-effective, and environmentally thoughtful means for packaging an article.

Having described preferred embodiments of a new and improved means for packaging an article, it is believed that other modifications, variations and changes will be suggested to those skilled in the art in view of the teachings set forth herein. It is therefore to be understood that all such variations, modifications and changes are believed to fall within the scope of the present invention as defined by the to be appended claims.

It is contemplated that any optional feature of the inventive variations described may be set forth and claimed independently, or in combination with any one or more of the features described herein. Reference to a singular item includes the possibility that there is a plurality of the same items present.

More specifically, as used herein and in the appended claims, the singular forms "a," "an," "said," and "the" include plural referents unless specifically stated otherwise. In other words, use of the articles allow for "at least one" of the subject item in the description above. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the to be appended claims shall allow for the inclusion of any additional element irrespective of whether a given number of elements are enumerated in the to be appended claims, or the addition of a feature could be regarded as transforming the nature of an element set forth in the to be appended claims. Except as specifically defined herein, all technical and scientific terms used herein are to be given as broad a commonly understood meaning as possible while maintaining future claim validity. The breadth of the present invention is not to be limited to the examples provided and/or the subject specification, but rather only by the scope of any future claim language.

Use of the term "invention" herein is not intended to limit the scope of the future claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Abstract, Definitions, Background of the Invention, Summary of the Invention, and Description of the Drawings) be accorded special significance in describing the invention relative to another or the future claims.

DETAILED DESCRIPTION OF THE INVENTION

Article: We shall refer to the term "article" to define any physical object that may have mass and weight.

Molded fiber or pulp: Molded fiber/pulp is a packaging material, typically made from recycled corrugated containers, paperboard and newspaper—however, agricultural waste is also not uncommon—mixed with water to create a slurry that can be molded into a finished product. It is used for protective packaging or for food service trays and beverage carriers. Molded pulp is considered a truly sustainable packaging material since it is produced from recycled or waste materials and can be recycled again after its useful lifecycle. It is what is typically referred to as a "cradle-to-cradle" product.

Die cut: Piece of cardboard, paper, or other material that has been cut into a special shape or design in a process similar to printing, except that a sharp steel die is used in place of a printing plate.

Corrugated: Packaging material formed by gluing one or more fluted sheets of paperboard (corrugating medium) to one or more flat sheets (called facings) of linerboard.

Paperboard: Paperboard is material similar in shape and composition to paper, but generally thicker, stronger, and more rigid.

Linerboard: Linerboard is a type of paperboard used specifically for containers, such as corrugated boxes.

Cardboard, boxboard: Similar to paperboard and linerboard.

Cavity: We shall refer to the term "cavity" to define any "cup" or "depression" or "channel" in the backing piece for holding an article.

UPC (Universal Product Code): The standard bar code printed on retail merchandise. The UPC is read by scanning the bar code at checkout counters in supermarkets and retail stores. Handheld UPC scanners are used to inventory merchandise stocked on shelves.

Lug: A lug is a projecting part of a larger piece that helps to provide stability.

Phthalates: Phthalates, or phthalate esters, are esters of phthalic acid and are mainly used as plasticizers (substances added to plastics to increase their flexibility, transparency, durability and longevity). They are used primarily to soften polyvinyl chloride (PVC). Phthalates are being phased out of many products in the United States, Canada and the European Union over health concerns.

Organotins: An organotin compound is commercially applied as a hydrochloric acid scavenger (or heat stabilizer) in polyvinyl chloride and as a biocide. Concerns over the toxicity of these compounds (some reports describe biological effects to marine life at a concentration of 1 nanogram per liter) have led to a worldwide ban by the International Maritime Organization.

Blister Pack: A blister pack is a transparent, molded piece of (PVC) plastic, often sealed to a sheet of cardboard, used to package and display an item of merchandise.

Sustainability: Meeting the needs of the present without compromising the ability of future generations to meet their own needs.

What is claimed is:

1. A package comprising:
a backing made from a recyclable molded pulp product;
a card made from a recyclable paper product;
a cavity formed in the backing;
a slot formed in the backing; and
a tab disposed on the card, wherein the slot is configured to receive the tab.

2. The package of claim 1, further comprising a die cut formed in the card.

3. The package of claim 2, further comprising a second die cut formed in the card.

4. The package of claim 3, wherein the second die cut varies in size from the first die cut.

5. The package of claim 2, wherein the die cut is rectangular.

6. The package of claim 2, wherein at least a portion of the cavity is visible via the die cut.

7. The package of claim 1, further comprising a hole formed in the backing, and a hole formed in the card such that at least a portion of the backing hole and the card hole coincide when the tab is received in the slot.

8. The package of claim 1, wherein the tab is releasably received in the slot.

9. The package of claim 1, wherein the backing and the card are glued.

10. The package of claim 1, further comprising a second slot formed in the backing and a second tab disposed on the card, wherein the first and second slots are configured to receive the first and second tabs.

11. The package of claim 1, wherein the cavity formed in the backing is configured to receive an article.

12. The package of claim 1, wherein the backing and the card are connected.

13. A packaging assembly comprising:
a back piece made from a recyclable molded pulp product;
a front made from recyclable paperboard;
a cavity formed in the back piece for receiving an article;
slots formed in the back piece;
tabs disposed on the front;
a hole formed in the back piece;
a hole formed in the front; and
wherein the slots are configured to receive the tabs, and wherein at least a portion of the hole formed in the back piece and the hole formed in the front coincide when the slots have received the tabs.

14. The packaging assembly of claim 13, wherein one of the tabs has a length equal to or greater than the length of one of the slots.

15. The packaging assembly of claim 13, wherein the front is substantially planar.

16. The packaging assembly of claim 13, further comprising a die cut formed in the front.

17. A package comprising:
a backing made from a recyclable molded pulp product;
a card made from a recyclable paper product;
a cavity formed in the backing;
a die cut formed in the card wherein the backing and the card are glued together; and
at least a portion of the cavity is visible via the die cut.

18. The package of claim 17, further comprising a second die cut formed in the card, through which at least a portion of the cavity is visible.

19. The package of claim 18, wherein the second die cut varies in size from the first die cut.

20. The package of claim 17, wherein the cavity formed in the backing is configured to receive an article.

* * * * *